Dec. 15, 1936.  B. M. SHORT  2,063,957
BUMPER CONSTRUCTION
Filed Jan. 29, 1934
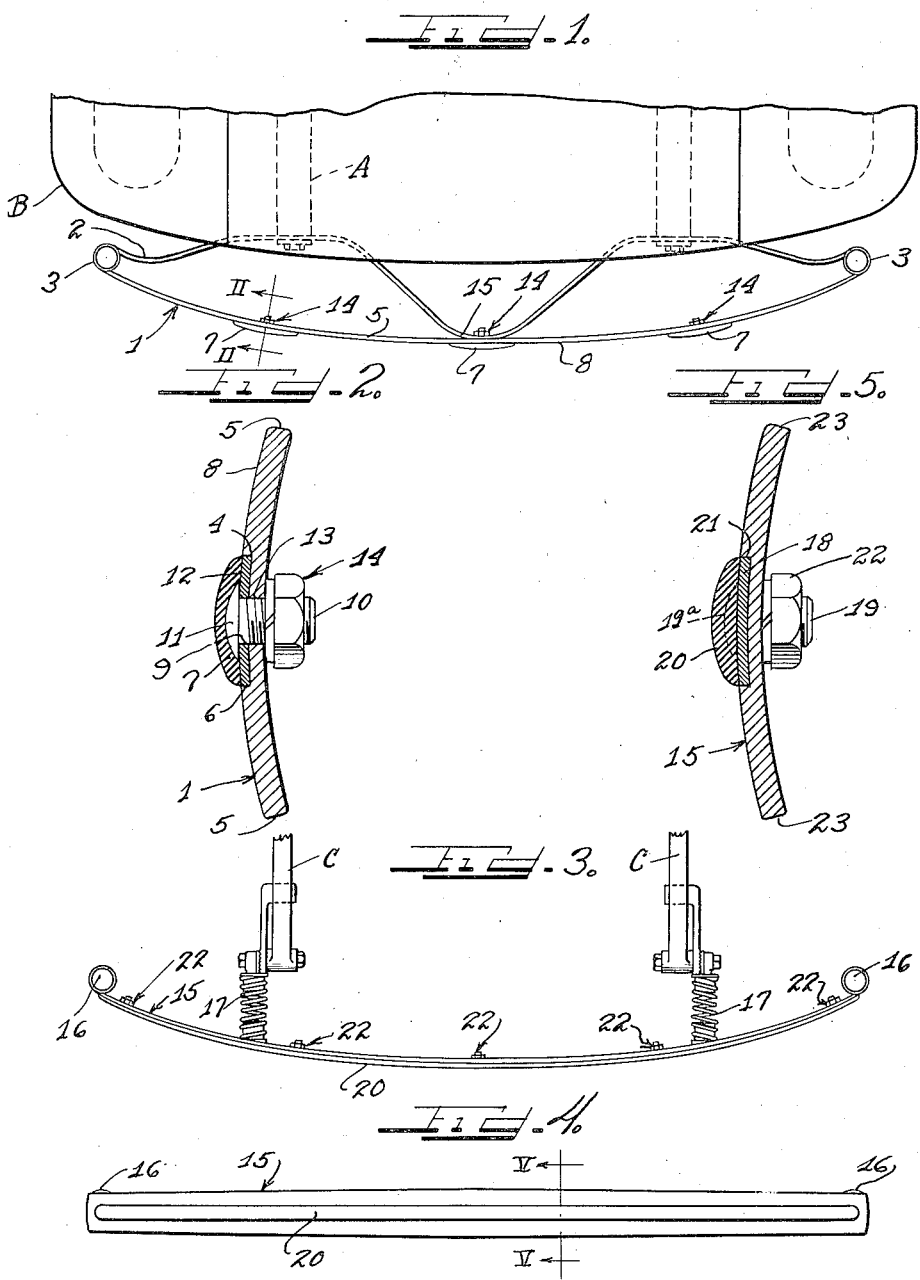
Inventor
Bladen M. Short.

Patented Dec. 15, 1936

2,063,957

UNITED STATES PATENT OFFICE 2,063,957

BUMPER CONSTRUCTION

Bladen M. Short, Detroit, Mich., assignor to General Spring Bumper Corporation, Detroit, Mich., a corporation of Michigan Application January 29, 1934, Serial No. 708,729

4 Claims. (Cl. 293—55)

This invention has to do with bumpers and is more particularly concerned with means associated with and forming a part of the impact bar structure for enhancing the cushioning effect of the bumper.

It is an object of the invention to provide a bumper impact bar with means for affording an auxiliary cushion to impacts upon the impact bar.

It is another object of the invention to provide an impact structure of metallic and relatively yielding material, with the latter material so positioned as to prevent hard objects from striking the outer surface of the impact bar.

It is a further object of the invention to provide a metallic bumper impact bar with a rubber or like insert by an improved attaching means.

In accordance with the general features of the invention, one form embodies a plurality of cushioning inserts, preferably two or more in number, secured preferably symmetrically on the front side of the impact bar at spaced points thereon, the cushioning portion consisting preferably of suitable soft yieldable material such as flexible rubber. The rubber is vulcanized or bonded to a metallic element of substantially like configuration so that they are substantially inseparable, an attaching element such as a bolt being united thereto during the uniting process. The impact bar is provided with holes at suitable points and with grooves or slots at such points, to permit the cushioning member to be fitted in its respective slots and the attaching bolt thereof to pass rearwardly through the corresponding impact bar opening and to be held in place by suitable lock washer and nut means.

In accordance with another feature of the invention, instead of providing a plurality of inserts, the insert is made substantially coextensive with the impact bar and provided preferably with a plurality of attaching elements, the metallic part of the impact bar being provided with corresponding holes to receive the same.

The invention affords not only protection to the impact surface of the impact bar, but serves as a means for ornamenting the same, the cushioning means being preferably of a contrasting color with respect to the impact surface of the bumper.

Other objects and advantages of the invention will appear as the description proceeds.

This invention (in preferred forms) is illustrated in the drawing and hereinafter more fully described.

On the drawing:

Figure 1 is a fragmentary plan view showing a portion of an automobile with a bumper constructed in accordance with the present invention attached thereto.

Figure 2 is an enlarged sectional view taken substantially in the plane designated by the line II—II in Figure 1, said parts being shown for convenience in elevation.

Figure 3 is a view similar to Figure 1 but showing a somewhat modified form of bumper and modified form of cushioning means therefor.

Figure 4 is an elevational view of the bumper impact structure of Figure 3.

Figure 5 is an enlarged sectional view taken substantially in the plane designated by the line V—V in Figure 4.

As shown on the drawing:

Referring now more particularly to the drawing, the bumper of Figure 1 comprises an impact bar 1 and a back bar 2 suitably connected at their ends 3 by a hinge or other joint, the back bar being formed to be supported by the frame A or other suitable part of the automobile B.

In the form of the invention shown in Figures 1 and 2, the impact bar 1 is provided with a groove 4 extending preferably longitudinally thereof and intermediate its upper and lower edges 5. In the illustrated embodiment of the invention, one such groove is provided in the front surface of the impact bar 1 on opposite sides of the center of the bar and, if desired, also at the center where the bars 1 and 2 are connected together. Each cushioning device comprises essentially a preferably metallic rigid strip 6 and a resilient cushioning strip 7 of flexible rubber or the like vulcanized or bonded to the strip 6 so as, for all practical purposes, to be substantially integrally united therewith. The strips 6 and 7 are of such size as to fit in the groove 4 and preferably to substantially fill the same with the rubber strip extending forwardly beyond the impact surface 8 of the impact bar 1. The strip 6 is shown of a thickness substantially equal to the depth of the groove 4, although it will be appreciated that, if desired, the groove may be made deeper or less deep.

Prior to the uniting of the strips 6 and 7, the strip 6 is provided with an opening 9 in which a screw or bolt 10 is inserted so that the head 11 of such securing element is positioned against that face 12 of the strip 6 to which the cushioning strip 7 is to be secured, as shown in Figure 2. Thereafter, the strip 7 is secured to the strip 6, so that the securing element 10 is permanently united thereto.

The impact member 1 is provided with an opening 13 to receive the securing element 10 which projects rearwardly beyond the impact member 1 to receive lock washer and nut means designated generally by the reference character 14. In the event the cushioning device is to be used as the medallion for clamping the bars 1 and 2 together at the center thereof, the central portion 15 of the back bar 2 will be located between the tightening and holding means 14 and the impact bar 1 as shown in Figure 1.

In the form of the invention shown in Figure 1, the cushioning devices are of slight longitudinal extent relative to the impact bar 1. This extent of the cushioning devices may be varied as desired. For example, instead of providing a plurality of devices as shown in Figure 1, each such device may be of such longitudinal extent as to require the employment of two or more securing elements 10. Moreover, while in Figure 1 a plurality of cushioning devices is illustrated in conjunction with a double bar bumper, it is well within the province of the invention to employ such devices with any type of bumper construction including bumperettes.

In the form of the invention shown in Figures 3, 4 and 5 a modified impact bar support and cushioning device are disclosed. The impact bar 15 may be provided with suitable ornamental caps 16 at its ends and supported and cushioned with respect to the frame C by springs 17 and so that the impact bar may be supported at different angles relative to the frame C.

In accordance with this form of the invention, the cushioning device is longitudinally substantially coextensive with the impact bar 15 and comprises a preferably metallic strip 18, securing elements 19 and a cushioning strip 20 of rubber or the like substantially coextensive with each other, and fitting in a substantially coextensive groove 21, the arrangement being substantially identical with that of Figures 1 and 2 except that the cushioning device comprising the elements 18, 19 and 20 is of greater extent and consequently is provided with a plurality of longitudinally spaced attaching elements 19 to which a corresponding number of clamping means 22 is provided as seen in Figure 3. In Figure 5, the head of the element 19 is shown in dotted lines at 19a. The cushioning device of Figures 3, 4 and 5 is preferably located substantially equidistant from the upper and lower edges 23 of the impact bar 15, although any other suitable arrangement may be made without departing from the principles of the invention.

The forms of the invention are illustrated in conjunction with an impact bar of concavo-convex cross section, but it will be understood that the invention is susceptible of use in conjunction with an impact bar of any desired longitudinal and transverse from.

With this invention, means is provided whereby the cushioning means will intercept objects which would otherwise impact and mar the impact surface of the impact bar provided with a device embodying the invention, said surface being commonly chrome or otherwise plated or coated.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. Bumper construction comprising a substantially flat impact bar having a recess in the impact face thereof, a cushioning device for said bar, said cushioning device being of laminated form, one layer comprising a metallic member seated in the recess, and a second layer of elastic material integrally united to the first layer and projecting clear of the impact face so as to intercept objects which would otherwise collide with said impact face, and means attaching the cushioning device to the impact bar.

2. Bumper construction comprising an elongated impact bar structure having spaced substantially flat, vertical impact surfaces between the longitudinal edges of the structure, protective means comprising relatively rigid reinforcing means projecting between said surfaces and relatively elastic means connected to said relatively rigid means and projecting in advance of said surfaces, and means for securing said protective means in assembly with said structure.

3. Bumper construction comprising an elongated impact bar structure having spaced substantially flat, vertical impact surfaces between the longitudinal edges of the structure, protective means comprising relatively rigid reinforcing means projecting rearwardly of and between said surfaces and relatively elastic means connected to said relatively rigid means and projecting in advance of said surfaces, and means for securing said protective means in assembly with said structure.

4. Bumper construction comprising an elongated impact bar structure having spaced impact surfaces between the longitudinal edges of the structure, protective means comprising relatively rigid reinforcing means clear of and projecting between said surfaces and relatively elastic means connected to said relatively rigid means and projecting in advance of said surfaces, and means for securing said protective means in assembly with said structure.

BLADEN M. SHORT.